United States Patent [19]

Ikeda et al.

[11] Patent Number: 4,715,582
[45] Date of Patent: Dec. 29, 1987

[54] METHOD OF WINDING OPTICAL CABLE ON AERIAL WIRE

[75] Inventors: Akitoshi Ikeda, Tokorozawa; Chitoshi Nishimura, Kawasaki; Norio Katsuoka, Tokyo; Masami Obara, Nikko, all of Japan

[73] Assignee: The Furukawa Electric Co., Ltd., Tokyo, Japan

[21] Appl. No.: 847,271

[22] Filed: Apr. 2, 1986

[30] Foreign Application Priority Data

Apr. 3, 1985 [JP] Japan .................................. 60-69171

[51] Int. Cl.⁴ ............................................. B65H 59/00
[52] U.S. Cl. ......................................... 254/134.3 CL
[58] Field of Search ................................ 57/9, 10, 60; 254/134.3 CL, 134.3 R

[56] References Cited

U.S. PATENT DOCUMENTS

| | | | |
|---|---|---|---|
| 2,080,918 | 5/1937 | Honig | 57/60 |
| 2,402,172 | 6/1946 | Macy | 254/134.3 CL |
| 3,005,304 | 10/1961 | Holm | 57/60 |
| 3,174,725 | 3/1965 | Pfundt | 57/10 |
| 3,593,508 | 7/1971 | Jackimowicz et al. | 57/60 |

*Primary Examiner*—Robert C. Watson
*Attorney, Agent, or Firm*—Schwartz, Jeffery, Schwaab, Mack, Blumenthal & Evans

[57] ABSTRACT

A method of winding an optical cable on an aerial wire which comprises a bobbin winding the optical cable while imparting a twist reverse to the twist given to the optical cable when the cable is wound on the wire and the step of feeding the optical cable from said bobbin while rotating said bobbin around the aerial wire to wind the cable on the wire. The twist of the optical cable is once at every 30 to 40 cm of the length of the optical cable. Thus, the cable is wound on the wire by reducing the twist imparted to the cable to zero or at least small value.

7 Claims, 3 Drawing Figures

METHOD OF WINDING OPTICAL CABLE ON AERIAL WIRE

BACKGROUND OF THE INVENTION

This invention relates to a method of winding an optical cable on an aerial wire such as an aerial ground wire.

Heretofore, an optical cable has been wound on the outer periphery of an aerial wire by feeding the optical cable from a bobbin with the optical cable by rotating the bobbin around the aerial wire. The winding pitch of the optical cable is set so as not to increase the wind pressure at present, but since the set pitch generally does not exceed up to 27 times the outer diameter of the wire, the pitch is a mere 30 to 40 cm in practice.

When the optical cable is thus wound on the aerial wire, the cable is twisted once per 30 to 40 cm in length, and the twisted stress remains after the cable is settled and thereby affects the cable. Thus, the lifetime of the optical fiber is undesirably shortened by the continuing stress.

SUMMARY OF THE INVENTION

Accordingly, an object of this invention is to provide a method of winding an optical cable on an aerial wire so that the resultant twist imparted to the cable is reduced to zero or at least small value.

In order to achieve the above and other objects, the invention employs an optical cable which, when wound on a bobbin, has a reverse twist imparted to it. The reverse twist is the reverse of the twist given to the cable when winding the cable on the aerial wire.

Thus, when the reverse twist is imparted to the optical cable as it is wound on the bobbin and the optical cable is thereafter wound on an aerial wire the optical cable has no twist or much less twist than the conventional optical cable wound on an aerial wire.

The above and other related objects and features of the invention will be apparent from a reading of the following description of the disclosure together with the accompanying drawings and the novelty thereof pointed out in the appended claims.

DESCRIPTION OF THE PREFERRED EMBODIMENTS

Figure 1:
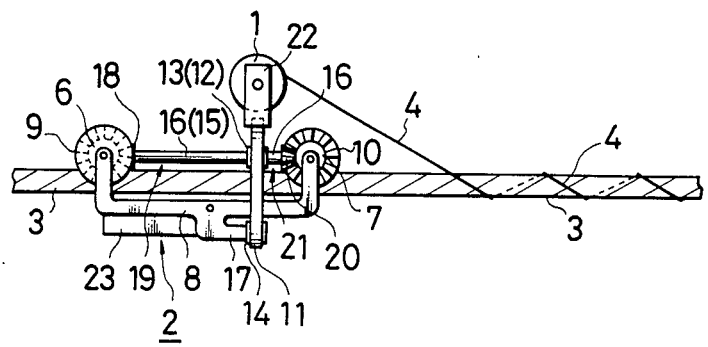
FIG. 1 is a side view showing an optical cable wound on an aerial wire by a winding machine according to the invention.
Figure 2:
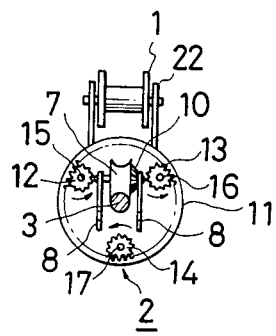
FIG. 2 is the side sectional view of a winding machine shown in FIG. 1.

An embodiment of a method of winding an optical cable on an aerial wire according to this invention will now be described in detail with reference to FIGS. 1 to 3.

Figure 3:
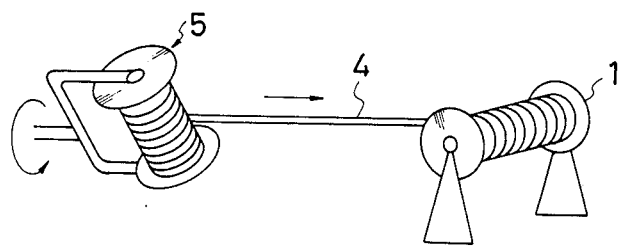
FIG. 3 is a perspective view showing a reverse twist being imparted to the optical cable as it is wound on the bobbin.

In this embodiment, before winding an optical cable 4 on an aerial wire 3 by feeding the cable 4 from a bobbin 1 while rotating the bobbin 1 around the wire 3 by a winding machine 2, the cable 4 is first wound on the bobbin 1 by rotating a supply drum 5 as shown in FIG. 3. A reverse twist which is opposite to the twist given the cable 4 when it is wound once on the wire 3 is thereby imparted. The optical cable 4 is then wound on aerial wire 3 at a pitch of 30 to 40 cm once at every 30 to 40 cm after bobbin 1 is set in the winding machine 2. The machine 2 of the embodiment has a truck 8 including front and rear rollers 6 and 7 which rotate on the wire 3. Drive gears 9 and 10 formed of bevel gears are respectively integrally coupled with the rollers 6 and 7 in reverse direction, and the gears 9 and 10 rotate as the rollers 6 and 7 rotate. An internal toothed gear 11 of split structure is engaged and arranged at the rear on the outer periphery of the truck 8 to rotate around the wire 3. Driven gears 12, 13 and 14 are engaged in mesh with the inner periphery of the gear 11 substantially at 120°, and the gear 11 is supported concentrically with respect to the wire 3 by the gears 12, 13 and 14. The gears 12 and 13 are respectively integrally supported at one end of rotational shafts 15 and 16 while the gear 14 is rotatably supported by a shaft 17. The shafts 15 and 16 are rotatably supported by the truck 8. The shaft 17 is fixedly supported by the truck 8. A bevel gear 18 is mounted integrally with the other end of the shaft 15, and the gear 18 meshes with the bevel gear 9. The gear 18 and the shaft 15 constitute rotary force transmitting means 19 for transmitting a rotary force to the gear 12. A bevel gear 20 is mounted integrally with the other end of the shaft 16, and meshes with the bevel gear 10. The gear 20 and the shaft 16 constitute rotary force transmitting means 21 for transmitting a rotary force to the gear 13. The bobbin 1 for supplying the optical cable 4 is rotatably supported by a bracket 22 above part of the outer periphery of the gear 11. A balance weight 23 is supported by the lower portion of the truck 8 so as to provide traveling stability to the truck 8.

In the winding machine 2 arranged as described above, when the truck 8 is towed by a wire rope, the rollers 6 and 7 riding on the aerial wire 3 rotate the gears 9 and 10 integral with the rollers to rotate, and the rotary force is transmitted by the rotary force transmitting means 19 and 21 to the gears 12 and 13. As the gears 12 and 13 rotate, the gear 11 and the bobbin 1 are rotated around the aerial wire 3. As the bobbin 1 rotates around the wire 3, the optical cable 4 is automatically wound on the wire 3. Since the optical cable 4 is reversely twisted in advance as described above, the cable 4 is not twisted after it is wound on the wire 3.

It is noted that, if the one twist per 30 cm of the pitch of the optical cable 4 is detrimental to the cable 4, the twist may be imparted at every 60 cm of pitch. Thus, since the twist of the cable 4 when wound on the wire 3 is reduced, the twist may be acceptable in practice.

According to the invention as described above, a bobbin is wound with an optical cable imparted with a reverse twist and the cable is then wound on the aerial wire while rotating the bobbin around the outer periphery of the wire. Thus, the twist of the optical cable wound on the wire is reduced to zero or at least to smaller value than the twist of a conventional optical cable, thereby extending the lifetime of the optical cable.

What is claimed is:

1. A method of winding an optical cable on an aerial wire, comprising the steps of:
    providing an optical cable wound on a spool, the optical cable having a preset twist in one direction;
    providing a means for winding the optical cable on the aerial wire; and
    winding the optical cable on the aerial wire in a direction opposite to the direction of the preset twist of the optical cable, whereby the preset twist opposes the twist induced by the winding of the optical cable on the aerial wire so that twisting stress on the optical cable is minimized.

2. A method of winding an optical cable as claimed in claim 1 wherein the step of providing an optical cable comprises providing an optical cable having a twist at every thirty to forty centimeters of the length of the cable.

3. A method of winding an optical cable as claimed in claim 1, wherein the step of providing an optical cable comprises providing an optical cable having a twist at approximately every 60 centimeters of the length of the optical cable.

4. A method of winding an optical cable on an aerial wire comprising the steps of:
   providing an optical cable and a spool;
   winding the optical cable on the spool;
   imparting a twist to the optical cable during said winding step so that the optical cable has a preset twist after it is wound on the spool;
   providing a means for winding the optical cable on the aerial wire; and
   winding the optical cable on the aerial wire in a direction opposite to the direction of the preset twist of the optical cable, whereby the preset twist opposes the twist induced by the winding of the optical cable on the aerial wire so that twisting stress on the optical cable is minimized.

5. A method of winding an optical cable as claimed in claim 4 wherein the step of imparting a twist to the optical cable comprises providing a supply drum wound with the optical cable, unwinding the optical cable from the supply drum onto the spool and rotating the supply drum as the optical cable is wound on the spool so as to impart a twist.

6. A method of winding an optical cable on an aerial wire as claimed in claim 4 wherein the step of imparting a twist to the optical cable comprises imparting a twist every thirty to forty centimeters of the length of the cable.

7. A method of winding an optical cable on an aerial wire as claimed in claim 4, wherein the step of imparting a twist to the optical cable comprises imparting a twist at approximately every sixty centimeters of the length of the cable.

* * * * *